(12) United States Patent
Domlatil

(10) Patent No.: US 10,973,234 B2
(45) Date of Patent: Apr. 13, 2021

(54) DEVICE FOR SEPARATING SAUSAGES

(71) Applicant: Inotec Gmbh Maschinenentwicklung Und Vertrieb, Reutlingen (DE)

(72) Inventor: Miroslav Domlatil, Reutlingen (DE)

(73) Assignee: Inotec Gmbh Maschinenentwicklung Und Vertrieb, Reutlingen (DE)

( * ) Notice: Subject to any disclaimer, the term of this patent is extended or adjusted under 35 U.S.C. 154(b) by 0 days.

(21) Appl. No.: 16/625,854

(22) PCT Filed: Jun. 22, 2018

(86) PCT No.: PCT/EP2018/066702
§ 371 (c)(1),
(2) Date: Dec. 23, 2019

(87) PCT Pub. No.: WO2018/234520
PCT Pub. Date: Dec. 27, 2018

(65) Prior Publication Data
US 2020/0120942 A1   Apr. 23, 2020

(30) Foreign Application Priority Data

Jun. 23, 2017 (DE) .................. 10 2017 114 041.7
Jul. 6, 2017 (DE) .................. 10 2017 115 090.0
Dec. 18, 2017 (DE) .................. 10 2017 130 320.0

(51) Int. Cl.
*A22C 11/00* (2006.01)

(52) U.S. Cl.
CPC .................. *A22C 11/006* (2013.01)

(58) Field of Classification Search
CPC .................. A22C 11/00; A22C 11/006
(Continued)

(56) References Cited

U.S. PATENT DOCUMENTS 2,882,163 A * 4/1959 Knaff .................. A23L 13/65
426/412
3,943,606 A * 3/1976 Ernst .................. A22C 15/002
24/3.1
(Continued)

FOREIGN PATENT DOCUMENTS

DE 2108803 A1 9/1971
DE 4307637 C2 4/1995
(Continued)

OTHER PUBLICATIONS

International preliminary report on patentability for patent application No. PCT/EP2018/066702 dated Dec. 24, 2019.
(Continued)

*Primary Examiner* — Richard T Price, Jr.
(74) *Attorney, Agent, or Firm* — Bachman & LaPointe, PC

(57) ABSTRACT

In a device and a method for separating at least one sausage (3.1-3.4) from another sausage (3.2-3.4), from a strand of sausage (2) in the region of a setting region (4) formed between the sausage (3.1-3) with two setting points (7.1, 7.2).4) and the sausage strand (2), wherein the setting region (4) is at least partially wrapped by a cord (6) and this is continued from one sausage to the other for setting, at least one setting region (4) and the cord in this setting region should be assigned an automatically operating cutting device (11, 11.1) for simultaneously cutting the cord and setting region.

17 Claims, 3 Drawing Sheets

(58) Field of Classification Search
USPC .......................... 452/21, 22, 29–32, 49, 51
See application file for complete search history.

(56) References Cited

U.S. PATENT DOCUMENTS

| | | | | |
|---|---|---|---|---|
| 4,792,047 | A * | 12/1988 | Wood | A22C 13/0009 493/206 |
| 6,045,445 | A * | 4/2000 | Hummel | A22C 11/006 452/46 |
| 7,479,057 | B2 * | 1/2009 | Waldstaedt | A22C 11/105 452/32 |
| 7,618,307 | B2 * | 11/2009 | Gladh | A22C 11/104 452/51 |
| 8,747,192 | B2 * | 6/2014 | Sames | B65G 47/61 452/51 |
| 8,870,058 | B2 * | 10/2014 | Ebert | A22C 11/127 235/375 |
| 9,894,907 | B2 * | 2/2018 | Sames | A22C 11/02 |
| 2007/0254571 | A1 * | 11/2007 | Gladh | A22C 11/127 452/32 |
| 2011/0217913 | A1 * | 9/2011 | Haslacher | A22C 15/002 452/32 |

FOREIGN PATENT DOCUMENTS

| | | |
|---|---|---|
| DE | 202005021188 U1 | 4/2007 |
| EP | 0865732 A1 | 9/1998 |
| EP | 0872184 A1 | 10/1998 |
| EP | 1844659 A | 10/2007 |
| EP | 2409573 A2 | 1/2012 |

OTHER PUBLICATIONS

German office action for patent application No. 10 2017 115 090.0 dated Jun. 25, 2020.
German office action for patent application No. 10 2017 115 090.0 dated Mar. 12, 2020.

* cited by examiner

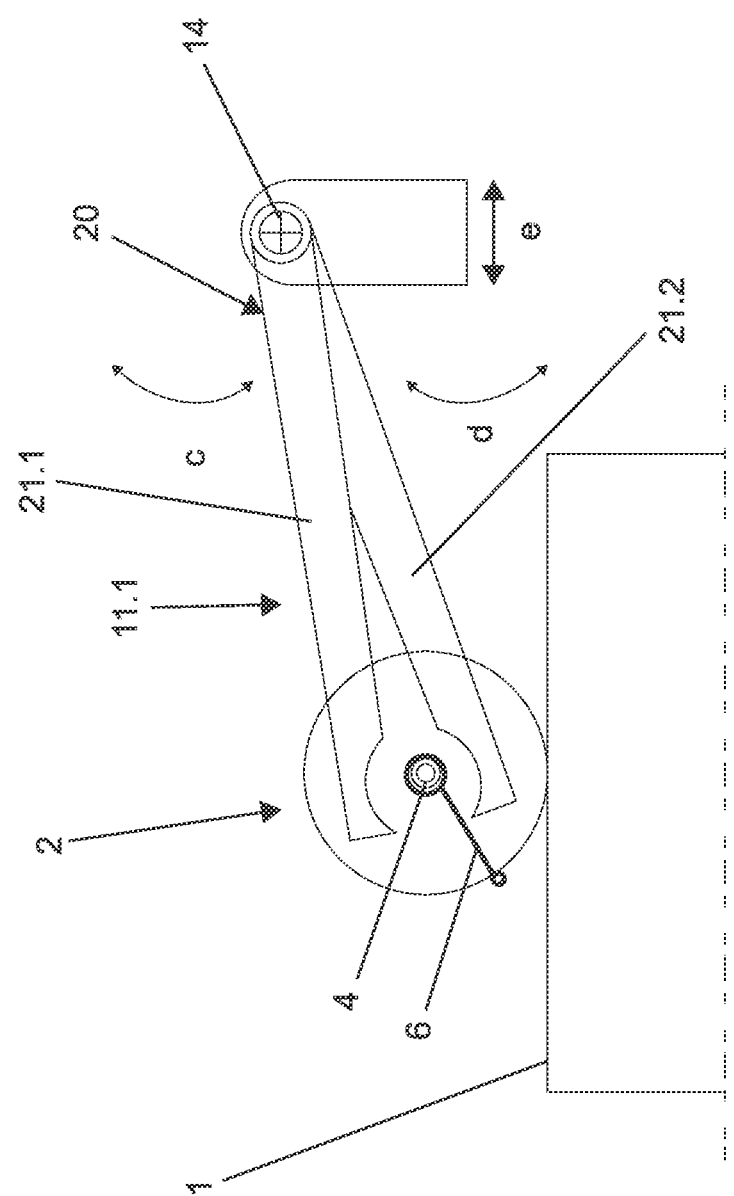

DEVICE FOR SEPARATING SAUSAGES

BACKGROUND OF THE INVENTION

The invention concerns a device for separating at least one sausage from another sausage, in particular from a strand of sausage in the region of a binding region formed with two binding points between the sausage and the strand of sausage, wherein the binding region is at least partially wrapped by a cord and this cord is continued from one sausage to the other for binding.

In the production of sausages on a sausage string, a sausage meat is usually filled by a filling machine via a filling tube into a tubular packaging material closed on one side, usually a natural or artificial casing, and individual sausages are then formed from this sausage string by twisting it off. Individual sausages can be separated from such a sausage strand in the area of the twisting point by a beating knife. A very successful slicing machine for separating sausages from the sausage strand is described in DE 43 07 637 C. The sausage strand can be separated from the sausage strand by means of a beating knife.

Another machine for the production of sausages on a sausage string is the so-called clip machine. Here the sausage meat is displaced from a certain area between the two sausages, which are to be separated, by means of a displacer. Two displacers are provided for this purpose, one being static and the other dynamic. Both displacers firstly enclose/string the sausage. The static displacer holds the casing. The dynamic displacer displaces the sausage meat so that there is a distance between the two displacers. Then two clips are placed at once at both ends of this displaced area. Such clip machines are described for example in DE 20 2005 021 188 U1.

Today, on the other hand, the old traditional method of tying sausages with a string is increasingly demanded. A sausage tied with natural string combines product safety and traditional appearance. The product tied with natural string is safe because no metal or plastic is used to separate the portions. The natural binding thread gives the product a handcrafted appearance.

These types of tying machines must be distinguished from clip machines. These machines also work with displacer pairs, one static and one dynamic. Both displacers first enclose/string the sausage. Parallel to the filled casing there is a string or cord which is wound once or several times around the casing by the machine at previously defined, product-related points, thus forming a first setting point. The static displacers hold the casing/sausage. The dynamic displacer now displaces the sausage meat so that there is a distance between the two displacers. The setting cord runs axially with the sausage meat. Then the second setting is produced. The two setting points and the distance between them, if one is created, are referred to as the setting area. In this way, sausages can be tied with or without an intermediate distance. Suspension loops can also be integrated or entire strands of sausage can be formed. Such a tying machine is shown, for example, in EP 0 865 732 A1.

Separated and portioned in this way, the sausages are then fed to the next processing step, e.g. scalding, drying or smoking. This form of portioning or packaging is used wherever either no metal/plastic is used or a traditional handcrafted appearance is simply to be achieved. With this process almost all types of sausage with all natural, collagen or artificial casings are used. There are also many different types and types of twine used in this process.

The problem with the well-known tying machines is that the sausages cannot easily be separated from the sausage strand, since the tying area and especially the string, which preferably wraps around the tying area several times, is very elastic. Accordingly, it offers little or no resistance to a percussive knife, which is used, for example, in a machine conforming to DE 43 18 301 A. The knife is not suitable for use in the production of a wide range of products. For this reason, on every setting machine on the market, the sausages must be cut individually by hand using scissors if individual portions are required. This is very tedious and time-consuming and the industrial customer is used to the clip machine, where in the meantime the individual sausages are separated mechanically and fully automatically.

SUMMARY OF THE INVENTION

The present invention is now based on the task of demonstrating a simple and cost-effective way of separating sausages from a string of sausages, even with a tying machine, in order to remain competitive with tying machines on the market.

The solution to this problem is that at least one setting area is assigned an automatically operating cutting device.

Since in the setting area the cord is also guided from setting point to setting point, the sausage skin and the cord are cut simultaneously in this setting area. This makes the tying machines competitive again compared to the clip machines, as the industrial customer's wish for the automatic separation of individual portions is met and the traditional tying of the tying machine is still maintained.

In a preferred example of the invention, not only a cutting position is provided at which a cutting process takes place. Preferably, at least three cutting positions can be provided so that sausages can also be cut in pairs or more from a sausage string. Accordingly, it is conceivable that a programmed cutting device controls the individual cutting positions. However, it is also preferable to provide several successive cutting devices which carry out the desired separation of the sausages from the sausage strand. For this purpose, the sausages are preferably moved on a conveyor belt.

The cutting device prefers to work mechanically, as this is the only way the individual portions can be cut automatically. This cutting device preferably has at least one cutting blade which cuts against a stop. This is a proven and good way to separate the individual portions quickly and cleanly. However, the cutting device can also have at least two cutting blades which interact like scissors.

There are no limits to the possibility of cutting. The cutting device of this invention should also be operable by laser and ultrasound or the like.

The cutting device should be present at at least one cutting position at which cutting takes place. In this case, the cutting device has a fixed position within the tying machine.

However, it is also possible for a cutting device to be present at other cutting positions. Several cutting devices on one machine can also be programmed, which means that work can be carried out even more efficiently and quickly. Several individual portions at the same time mean that work steps can be saved.

It is also conceivable that the cutting device(s) could be moved along the setting area. In this case, the most suitable cutting point can be searched for and found using appropriate sensors.

The setting area is at least partially wrapped by a cord, as the cord for setting is continued from one setting point to the other setting point in the setting area and from one sausage to the other. It does not have to be cut off separately for each sausage, which saves time. In addition, the string retains the natural and handcrafted appearance of the sausage.

In another example, a displacer is assigned to the setting area on one or both sides, as described in EP 0 865 732 A1. This displacer(s) should separate one sausage from the next, displace the sausage from the setting area and stretch the setting area so that the setting is better and the cutting device can perform its work more precisely.

The cutting device is placed after the normally static displacer so that the previous sausage cannot be damaged if there is only one displacer.

In the case of two displacers intended for the machine, the cutting device must be placed between the two in order to take full advantage of the aforementioned elongation and ensure a precise cut.

It is also provided that the cutting device can be moved along the setting area. This means that fewer faulty cuts are made and the cutting point can be set precisely.

In the process for separating at least one sausage from another sausage, in particular from a strand of sausage in the region of a setting region formed with two setting points between the sausage and the strand of sausage, wherein sausage is filled into a casing set at the front and after a predetermined portion a setting point to the following sausage is formed by looping around this point with a thread or a cord, it is provided that this setting region is severed by an automatically operating cutting device. This is in line with the customer's general wish for the tying machines to be more efficient and economical.

The sausage meat in the casing is usually constricted by two displacers, one of which remains static and the other dynamic, displacing the sausage meat from the setting area. This allows clean cutting at the setting area without contamination of the cutting device or sausage meat escaping.

The setting area is stretched before cutting, either by displacement or by a separate running conveyor belt or other means, to tension the sausage strand and give the cutting tool enough space and resistance to make its cut and to perform it easily.

The cutting device can be moved along the setting area and/or radially to the setting area. If one sausage is longer than the other, the slicer can move independently and move to another position if necessary. This also reduces the number of faulty cuts.

BRIEF DESCRIPTION OF THE DRAWINGS

Further advantages, features and details of the invention result from the following description of preferred execution examples as well as from the drawings; these show in:

FIG. 4 a schematic view of the device according to FIG. 1 in the running direction of the sausage in the region of another example of a cutting point.

DETAILED DESCRIPTION

Figure 1:
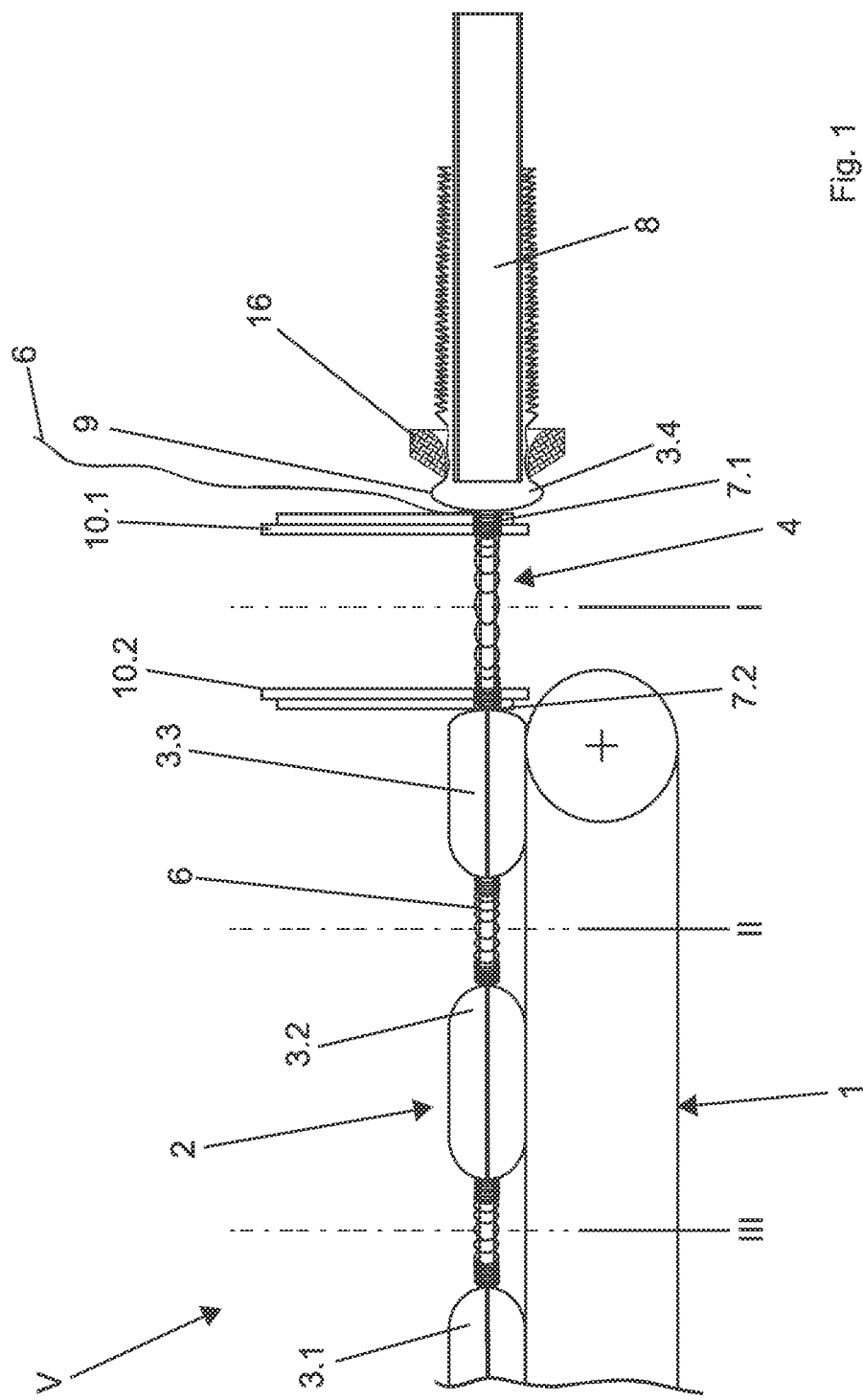
FIG. 1 shows a schematic side view of a device for separating a sausage, in particular from a strand of sausage in the area of a setting area.

FIG. 1 shows a device V for cutting off sausage according to the invention, which has a discharge belt 1 on which a sausage strand 2 is moved. The function of the discharge belt 1 is already known from previous inventions and is therefore not described further in the following.

The sausage strand 2 consists of sausages 3 and setting areas 4 between the sausages 3. In the setting areas 4 a sausage meat is largely removed, so that the setting areas are considerably diluted compared to the sausage. It is tightly wrapped by a cord 6. In the design example shown, the cord 6 is led over the entire sausage strand 2, whereby it is wound particularly strongly, especially at setting points 7.1 or 7.2 near a sausage, so that the contents in the sausage 3 cannot escape.

In addition, the device V has a filling tube 8 from which sausage meat is preferably filled into a casing or generally a casing 9 at the end of the filling tube 8. This casing 9 is pushed onto the filling tube 8 and tied in front of the opening of the filling tube 8. The sausage meat is pressed into the cured casing 9 from the filling tube 8, whereby the casing 9 from the filling tube 8 is pulled in according to the portion. Brakes 16 prevent sausage meat from flowing backwards and the cover 9 slips off the filling tube 8 when the sausage meat is poured in or the cover 9 is tensioned against the filling tube 8.

If only one cutting device 11, 11.1 is provided, cutting takes place in cutting position I; if several cutting positions II and III are provided, the respective sausages can also be cut off using separate cutting devices.

The cutting device 11 should be movable in the setting area 4 so that the optimum position for the cut can be detected automatically.

The cutting device 11 can also be positioned outside the displacers 10.1 and 10.2 and thus also cut the sausages 3.1, 3.2 or 3.3 in the cutting position II and/or III, for example. The discharge conveyor 1 runs faster so that the setting area is also stretched here.

Each setting area 4 is to be seen as a possible cutting position I to III in which the sausages 3 can be separated from each other, whereby in the preferred design example only the cutting position I is to be described in more detail.

In the cutting position I, displacers 10.1 and 10.2 are provided on at least one side of the setting area 4, but in the preferred design example on both sides. Both displacers 10.1 and 10.2 constrict the sausage strand 2, whereby one displacer 10.1 then remains static, while a dynamic displacer 10.2 pushes the sausage meat from the setting area 4 into the leading sausage 3.3. This also expands the setting area 4 so that a cutting device 11, which is described in more detail in FIGS. 3 and 4, can separate the sausages 3 from each other, preferably between the displacers 10.1 and 10.2.

It should be mentioned that also outside the displacers 10.1 and 10.2 at the cutting positions II and III a cutting device 11 can be arranged, which separates the sausages 3 from each other.

Figure 2:
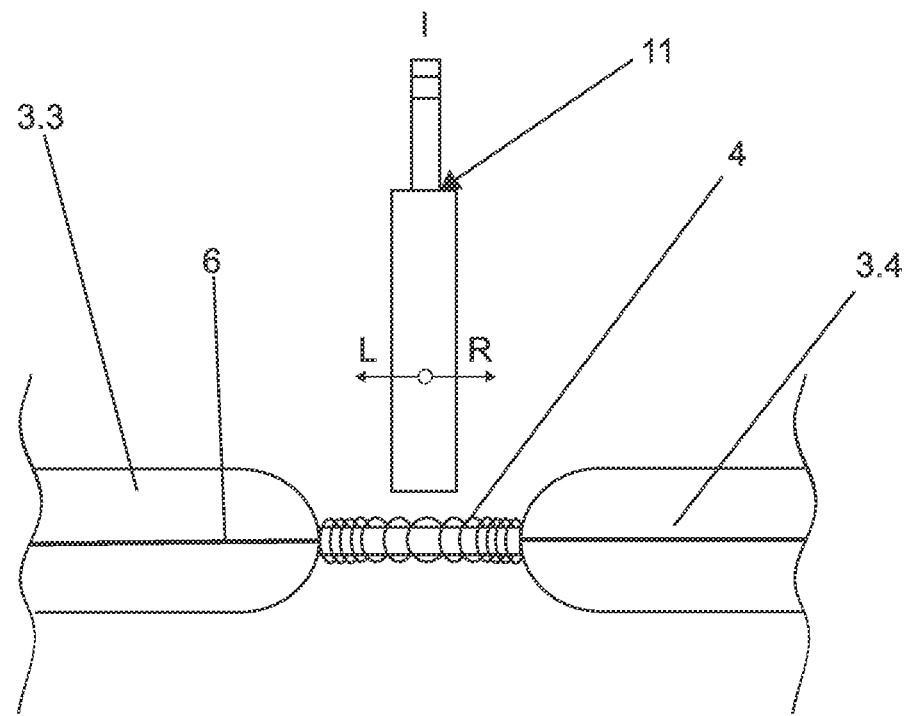
FIG. 2 shows a section of the device as shown in FIG. 1.

As shown in FIG. 2, an enlarged side view of a section of the cutting position I of the device V is shown, with the intended cutting device 11 at the setting area 4 being described here. The intended cutting device 11 should be movable along the arrows L and R at the setting area 4, so that an optimal cutting position I for the cutting device 11 is ensured.

Figure 3:
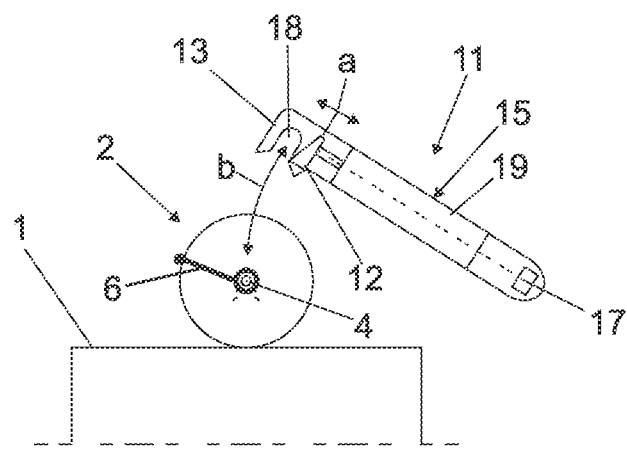
FIG. 3 a schematic view of the device according to FIG. 1 in the direction of travel of the sausage at a cutting point.

As shown in FIG. 3, the cutting device 11 has a swivel blade 15 which swivels around a shaft 17. Opposite the shaft 17, the swivel blade 15 is assigned a fork which has a longitudinal opening 18 to accommodate the setting area 4. The fork is also formed by a fixed stop 13 and a movable knife 12, the knife 12 having a blade which is tapered with respect to the stop 13 and which causes the setting area 4 to be drawn into the opening 18. The knife 12 is moved by a pneumatic cylinder 19. The movement is indicated by the arrow a. The swivel knife drive is also effected via a special cylinder. The pivoting movement b is also to be carried out pneumatically.

FIG. 4 shows a further example of a cutting device 11.1. Here a drive 14 is indicated which is to move the scissor arms 21.1 and 21.2 of a scissor 20 in the direction of the arrows c and d. The drive 14 is to be used to move the scissor arms 21.1 and 21.2 of a scissor 20 in the direction of the arrows c and d. The drive 14 is to be used to move the scissor arms 21.1 and 21.2 of a scissor 20 in the direction of the arrows c and d. This is also to be done automatically using pneumatic technology. Furthermore, the cutting device 11.1 should be movable towards and away from the setting area 4, so that a corresponding scissors mouth of the scissors 20 can accommodate the setting area.

Of course, many other cutting devices, such as lasers, ultrasound and the like, are also possible. The cutting device only has to be designed in such a way that it cuts both the sausage skin in the setting area and the cord in one operation. With the mechanical cutting devices shown in the figures, the cutting device detects and cuts both the sausage skin in the setting area and the cord. All this takes place in a single operation.

Reference List

| | | | |
|---|---|---|---|
| 1 | discharge belt | V | device |
| 2 | sausage strand | I | cutting position |
| 3 | sausage | II | cutting position |
| 4 | Setting area | III | cutting position |
| 5 | | L | Arrow |
| 6 | cord | R | Arrow |
| 7 | Setting points | a | Arrow |
| 8 | filling tube | b | Arrow |
| 9 | casing | c | Arrow |
| 10 | displacer | d | Arrow |
| 11 | Cutting device | e | Arrow |
| 12 | knife | | |
| 13 | Stop | | |
| 14 | drive | | |
| 15 | swivel blade | | |
| 16 | brake | | |
| 17 | shaft | | |
| 18 | Opening | | |
| 19 | cylinder | | |
| 20 | scissor | | |
| 21 | scissor arm | | |

The invention claimed is:

1. Device for separating at least one sausage (3.1-3.4) from another sausage (3.2-3.4),
wherein a setting region (4) is at least partially wrapped by a cord (6) and this is continued from one sausage to the other for setting,
wherein an automatically operating cutting device (11, 11.1) for simultaneously cutting through the cord and the setting region is assigned to at least one setting region (4) and the cord in this setting region.

2. Device according to claim 1, wherein a cutting device (11) is provided at a plurality of cutting positions (I, II, III).

3. Device according to claim 1, wherein the cutting device (11, 11.1) operates mechanically.

4. Device according to claim 1, wherein the cutting device (11) comprises at least one knife (12) which cuts against a stop (13).

5. Device according to claim 1, wherein the cutting device (11.1) has at least two scissor arms (21.1, 21.2) which interact in a scissor-like manner.

6. Device according to claim 1, wherein the setting region (4) is assigned a displacer (10.2, 10.2) on one or both sides.

7. Device according to claim 6, wherein the cutting device (11, 11.1) is arranged after a displacer (10.1).

8. Device according to claim 6, wherein the cutting device (11) is arranged between two displacers (10.1, 10.2).

9. Device according to claim 1, wherein the cutting device (11) is movable along the setting point (4).

10. Method for separating at least one sausage (3.1-3.4) from another sausage (3.1-3.4),
wherein sausage is filled into a casing (9) set at the front and, after a predetermined portion, a setting region (4) is formed for the following sausage (3.1-3.4)0.2-3.4) is formed by looping a thread or a cord (6) around this point and this is continued from one sausage to the other for tying,
wherein this tying region (4) and the cord (6) are cut in this tying region by an automatically operating cutting device (11, 11.1).

11. Method according to claim 10, wherein the sausage meat is displaced in the casing (9) at least to one side of the setting region (4).

12. Method according to claim 11, wherein the setting region (4) is cut between two displacers (10.1, 10.2).

13. Method according to claim 10, wherein the setting region (4) is stretched (L, R) before cutting.

14. Method according to claim 10, wherein the cutting device (11, 11.1) is moved along the setting area (4) and/or radially to the setting area (4).

15. Device according to claim 1, wherein the device is for separating at least one sausage from a sausage strand (2) in the region of a setting region (4) formed with two setting points (7.1, 7.2) between the sausage (3.1-3.4) and the sausage strand (2).

16. Method according to claim 10, wherein the at least one sausage (3.1-3.4) is separated from a strand of sausage (2) in the region of a setting region (4) formed with two setting points (7.1, 7.2) between the sausage (3) and the strand of sausage (2).

17. Method according to claim 11, wherein the sausage meat is displaced in the casing (9) to both sides of the setting region (4).

* * * * *